Feb. 1, 1955  B. H. CARROLL ET AL  2,701,198
SUPERSENSITIZED PHOTOGRAPHIC EMULSIONS
CONTAINING SIMPLE CYANINE DYES
Filed Feb. 16, 1954

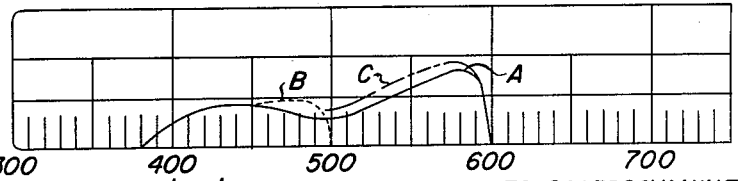

Fig. 1

A = 5,5', 6,6'- TETRACHLORO-1,1',3,3' TETRAETHYLBENZIMIDAZOLOCARBOCYANINE IODIDE
B = 3,3'- ETHYLENETHIACYANINE IODIDE
C = 5,5',6,6'- TETRACHLORO-1,1',3,3'-TETRAETHYLBENZIMIDAZOLOCARBOCYANINE IODIDE PLUS 3,3'- ETHYLENETHIACYANINE IODIDE

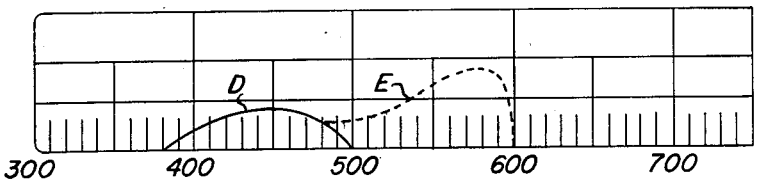

Fig. 2

D = 3,3'- DIMETHYLTHIACYANINE BROMIDE
E = 5,5', 6,6'-TETRACHLORO-1,1',3,3'-TETRAETHYLBENZIMIDAZOLOCARBOCYANINE IODIDE PLUS 3,3'- DIMETHYLTHIACYANINE BROMIDE

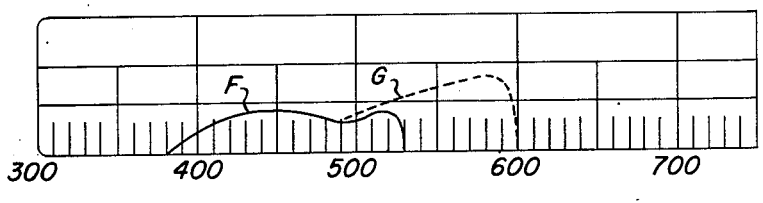

Fig. 3

F = 3,3'-DIETHYL-4,5,4',5'- DIBENZOSELENACYANINE IODIDE
G = 5,5',6,6'-TETRACHLORO-1,1',3,3'-TETRAETHYLBENZIMIDAZOLOCARBOCYANINE IODIDE PLUS 3,3'-DIETHYL-4,5,4',5'-DIBENZOSELENACYANINE IODIDE

BURT H. CARROLL
JEAN E. JONES
INVENTORS

BY

ATTORNEYS 2,701,198
Patented Feb. 1, 1955

2,701,198

SUPERSENSITIZED PHOTOGRAPHIC EMULSIONS CONTAINING SIMPLE CYANINE DYES

Burt H. Carroll and Jean E. Jones, Rochester, N. Y., assignors to Eastman Kodak Company, Rochester, N. Y., a corporation of New Jersey Application February 16, 1954, Serial No. 410,572

19 Claims. (Cl. 95—7)

This invention relates to photographic emulsions containing cyanine dyes, and as supersensitizers therefor, certain benzimidazolocarbocyanine dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found a new means of altering the sensitivity in emulsions containing cyanine dyes. Since the conditions in the emulsion, i. e. the hydrogen ion and/or the silver ion concentration undergo little or no change in our method, we shall designate our new method as a kind of supersensitization.

It is, therefore, an object of our invention to provide photographic emulsions containing cyanine dyes and, as supersensitizers therefore, certain benzimidazolocarbocyanine dyes. Another object is to provide a process for preparing these sensitized emulsions. Other objects will become apparent from a consideration of the following description and examples.

The cyanine dyes useful in practicing our invention can advantageously be represented by the following general formula:

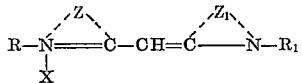

wherein R and R₁ each represents an alkyl group, such as methyl, ethyl, n-propyl, carbethoxymethyl, etc. or R and R₁ together represent an alkylene group, such as ethylene, propylene, etc., X represents an acid radical, such as chloride, iodide, bromide, perchlorate, p-toluenesulfonate, benzenesulfonate, ethylsulfate, methylsulfate, etc., and Z and Z₁ each represents the non-metallic atoms necessary to complete a heterocyclic nucleus containing from 5 to 6 atoms in the heterocyclic ring, e. g. a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5,6-dioxymethylenebenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the 2-quinoline series (e. g. 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 6-methoxy-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), etc.

The benzimidazolocarbocyanine dyes useful in practicing our invention can advantageously be represented by the following general formula:

II.

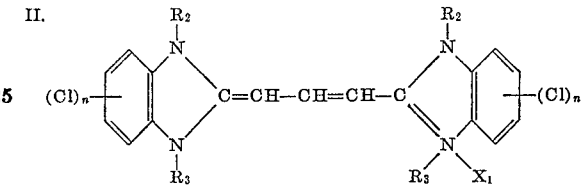

wherein R₂ and R₃ each represents an alkyl group, such as methyl, ethyl, allyl (vinylmethyl), etc., n represents a positive integer of from 1 to 2, and X₁ represents an acid radical, for example, those set forth above for X. The dyes represented by Formula II can advantageously be prepared according to the methods described in Van Lare U. S. application Serial No. 339,459, filed on February 27, 1953.

The dyes of Formula I above wherein R and R₁ together represent an alkylene group can be prepared as described in U. S. Patents 2,478,367 and 2,541,400 of Leslie G. S. Brooker and Robert H. Sprague.

According to our invention, we incorporate one or more of the cyanine dyes selected from those represented by Formula I above with one or more of the dyes selected from those represented by Formula II above in a photographic emulsion. Our invention is particularly directed to the ordinarily employed gelatino-silver-halide emulsions. However, our supersensitizing combinations can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing our invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations.

The concentrations of the individual dyes can then be increased until the optimum concentration of the supersensitizing combination is determined.

Ordinarily the optimum or near optimum concentration of the cyanine dyes selected from those represented by Formula I above, which we employ in practicing our invention, is of the order of from 0.025 to 0.30 g. per mol. of silver halide in the emulsion.

The carbocyanine dyes selected from those represented by Formula II above are advantageously employed in concentration on the order of 0.025 to 0.30 g. per mol. of silver halide in the emulsion.

Generally speaking, the ratio of concentration of the carbocyanine dye of Formula II to the cyanine dye of Formula I can vary rather widely in our combinations, e. g. from 1:20 to 1:1 (by weight) in many cases.

The methods of incorporating sensitizing dyes in emulsions are well known to those skilled in the art. In practicing our invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes of Formulas I and II which we employ, although acetone has also been found to be satisfactory in certain cases. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to the flowable gelatino-silver-halide emulsion, the desired amounts of the stock solution of one of the dyes are slowly added, while stirring the emulsion. Stirring is continued until the dye is thoroughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly our invention is directed to any emulsion containing a combination of the aforesaid sensitizing dyes whereby a supersensitizing effect is obtained.

The following examples will serve to illustrate further the manner of practicing our invention. To different portions of the same batch of photographic gelatino-silver-bromiodide emulsion were added (1) a cyanine dye selected from those of Formula I, (2) a carbocyanine dye selected from those represented by Formula II, and (3) a combination of the cyanine dye of Formula I and the carbocyanine dye of Formula II. In some instances, the table will show that a given coating gave only a low speed or one too small to measure in the region transmitted by the filter (designated asterisk in the table). Different emulsions were used in some of the examples, although the emulsions of each individual example were obtained from the same batch. The coatings of Examples 3 to 10 were obtained from the same batch of emulsion and the coatings of Examples 11 to 15 were obtained from the same batch of emulsion. Before coating, the emulsions containing the sensitizing dyes were digested for a short time in a tank maintained at 52° C. The different portions of emulsion were then coated on supports and exposed in the usual manner in a spectrograph and a sensitometer (Type Ib) through either a Wratten 12 filter, i. e. a filter which transmits substantially no light of wavelength shorter than 495 m$\mu$ and/or a Wratten 58 filter, i. e. a filter which transmits only light of wavelengths lying between 465 and 620$\mu$. The following are several examples of such emulsions together with the speed (minus blue or green), gamma and fog obtained after development of the exposed emulsions in the usual manner.

| Example | Dye (g. per mole of silver halide in emulsion) | Green Light Exposure | | Minus Blue Light Exposure | | |
|---|---|---|---|---|---|---|
| | | 10/i Speed | Gamma | 10/i Speed | Gamma | Fog |
| 1 | (a) 1'-ethyl-3-methylthia-2'-cyanine iodide (0.080) | | | 14.0 | 2.37 | .04 |
| | (b) 5,5',6,6'-tetrachloro-1,1',3,3'-tetraethylbenzimid-azolocarbocyanine iodide (0.040) | | | 33.0 | 2.19 | .05 |
| | (c) dye (a) (0.080) plus dye (b) (0.040) | | | 50.0 | 2.39 | .05 |
| 2 | (d) 1',3-diethyl-5,6-methylenedioxythia-2'-cyanine p-toluenesulfonate (0.080) | | | 10.7 | 2.42 | .05 |
| | (e) 5,5'-dichloro-1-1',3,3'-tetramethylbenzimidazolo-carbocyanine iodide (0.040) | | | 14.8 | 1.29 | .06 |
| | (f) dye (d) (0.080) plus dye (e) (0.040) | | | 31.0 | 2.35 | .05 |
| 3 | (g) dye (b) (0.080) | 18.5 | 2.33 | 50 | 2.42 | .04 |
| | (h) 1',3-diethylselena-2'-cyanine iodide (0.080) | 17.5 | 2.38 | 21.5 | 2.72 | .04 |
| | (i) dye (b) (0.080) plus dye (h) (0.080) | 36 | 2.22 | 80 | 2.30 | .04 |
| 4 | (j) 1',3-diethyl-6'-methyl-4,5-benzthia-2'-cyanine iodide (0.080) | 17.0 | 2.36 | 24.5 | 2.64 | .05 |
| | (k) dye (j) (0.080) plus dye (b) (0.080) | 40 | 2.23 | 90 | 2.24 | .05 |
| 5 | (l) 1',3-diethyl-6'-methoxy-5-phenylthia-2'-cyanine p-toluenesulfonate (0.080) | 19.0 | 2.10 | 26.5 | 2.22 | .05 |
| | (m) dye (l) (0.080) plus dye (b) (0.080) | 36 | 2.23 | 78 | 2.50 | .05 |
| 6 | (n) 1',3-diethyl-6'-methoxythia-2'-cyanine iodide (0.080) | 17.8 | 2.52 | 24 | 2.68 | .05 |
| | (o) dye (n) (0.080) plus dye (b) (0.080) | 36 | 2.36 | 76 | 2.50 | .04 |
| 7 | (p) 1,1'-diethyl-2,2'-cyanine iodide (0.080) | 3.55 | 2.10 | 7.8 | 2.10 | .04 |
| | (q) dye (p) (0.080) plus dye (b) (0.080) | 32 | 2.12 | 74 | 2.16 | .04 |
| 8 | (r) 1',3-diethyloxa-2'-cyanine iodide (0.080) | * | * | * | * | .04 |
| | (s) dye (r) (0.080) plus dye (b) (0.080) | 27.5 | 2.16 | 59 | 2.33 | .04 |
| 9 | (t) 5,5'-dichloro-3,3'-diethylthiacyanine iodide (0.080) | * | * | * | * | .04 |
| | (u) dye (t) (0.080) plus dye (b) (0.080) | 3.15 | 2.17 | 65 | 2.40 | .04 |
| 10 | (v) 3,3'-diethyl-4,5,4',5'-dibenzothiacyanine iodide (0.080) | 3.2 | 1.65 | * | * | .04 |
| | (w) dye (v) (0.080) plus dye (b) (0.080) | 37.0 | 1.96 | 71 | 2.18 | .05 |
| 11 | (x) dye (b) (0.080) | 25.5 | 1.95 | 76 | 1.88 | .03 |
| | (y) 3,3'-ethylenethiacyanine iodide (0.080) | * | * | * | * | .03 |
| | (z) dye (y) (0.080) plus dye (b) (0.080) | 39 | 2.07 | 73 | 2.28 | .03 |
| 12 | (a') 3,3'-dimethylthiacyanine bromide (0.080) | * | * | * | * | .03 |
| | (b') dye (a') (0.080) plus dye (b) (0.080) | 30 | 1.94 | 88 | 1.88 | .03 |
| 13 | (c') 3,3'-dimethylselenacyanine iodide (0.080) | * | * | * | * | .03 |
| | (d') dye (c') (0.080) plus dye (b) (0.080) | 28 | 1.95 | 69 | 2.16 | .03 |
| 14 | (e') 3,3'-diethylselenacyanine iodide (0.080) | * | * | * | * | .03 |
| | (f') dye (e') (0.080) plus dye (b) (0.080) | 27.5 | 2.20 | 65 | 2.38 | .03 |
| 15 | (g') 3,3'-diethyl-4,5,4',5'-dibenzoselenacyanine iodide (0.080) | 5.9 | 2.10 | 4.2 | 1.88 | .03 |
| | (h') dye (g') (0.080) plus dye (b) (0.080) | 40 | 1.65 | 86 | 1.73 | .03 |

The accompanying drawing illustrates the supersensitizing effect obtained with three of our new combinations of dyes in gelatino-silver-bromiodide emulsions. Each figure of the drawing is a diagrammatic reproduction of two, or in the case of Figure 1, three spectrographs. In each figure the sensitivity of the emulsion containing the cyanine dye of Formula I is represented by the solid lower curve. The upper curve represents the sensitivity conferred on the emulsion by the combination of the cyanine dye of Formula I and the carbocyanine dye of Formula II. In Figures 2 and 3, the curve showing the sensitivity conferred on the emulsion by the carbocyanine dye of Formula II alone has been eliminated as it is identical with that of curve A in Figure 1.

In Figure 1, curve A represents the sensitivity of an ordinary gelatino-silver-bromiodide emulsion sensitized with 5,5',6,6'-tetrachloro-1,1',3,3'-tetraethylbenzimidazolocarbocyanine iodide, curve B represents the sensitivity of the same emulsion containing 3,3'-ethylenethiacyanine iodide, and curve C represents the sensitivity of the same emulsion containing both 5,5'-6,6'-tetraethylbenzimidazolocarbocyanine iodide and 3,3'-ethylenethiacyanine iodide. The sensitometric measurements for these emulsions are given in Example 11 of the above table.

In Figure 2, curve D represents the sensitivity of an ordinary gelatino-silver-bromiodide emulsion sensitized with 3,3'-dimethylthiacyanine bromide and curve E represents the sensitivity of the same emulsion containing both 3,3'-dimethylthiacyanine bromide and 5,5',6,6'-tetrachloro - 1,1',3,3'- tetraethylbenzimidazolocarbocyanine iodide. The sensitometric measurements for these emulsions are given in Example 12 in the above table.

In Figure 3, curve F represents the sensitivity of an ordinary gelatino-silver-bromiodide emulsion sensitized with 3,3'-diethyl-4,5,4',5'-dibenzoselenacyanine iodide and curve G represents the sensitivity of the same emulsion containing both 3,3'-diethyl-4,5,4',5'-dibenzoselenacyanine iodide and 5,5',6,6'-tetrachloro-1,1',3,3'-tetraethylbenzimidazolocarbocyanine iodide. The sensitometric measurements for these emulsions are given in Example 15 in the above table.

Our invention is primarily directed to the ordinarily employed gelatino-silver-halide developing-out emulsions, e. g. gelatino-silver-chloride, -chlorobromide, -chloroiodide, -chlorobromiodide, -bromide and -bromiodide developing-out emulsions. While the results in the above table were obtained using gelatino-silver-bromiodide emulsions, excellent results have also been obtained using gelatino - silver - chlorobromide emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with our invention can be coated in the usual manner on any suitable support, e. g. glass, cellulose nitrate film, cellulose acetate film, polyvinylacetal resin film, paper or metal.

Photographic silver halide emulsions, such as those listed above, containing the supersensitizing combinations of our invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085, 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees— "The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll, U. S. application 771,380, filed August 29, 1947, now Patent No. 2,640,776, etc.; or mixtures of such addenda. Dispersing agents for color couplers, such as those set forth in U. S. Patents 2,322,027 and 2,304,940, can also be employed in the above-described emulsions.

What we claim as our invention and desire secured by Letters Patent of the United States is:

1. A photographic silver halide emulsion sensitized with a supersensitizing combination of at least one cyanine dye selected from those represented by the following general formula:

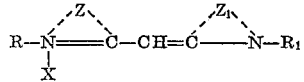

wherein R and R₁ each represents a member selected from the group consisting of an alkyl group, and R and R₁ together represent an alkylene group containing from 2 to 3 carbon atoms, X represents an acid radical, and Z and Z₁ each represents the non-metallic atoms necessary to complete a heterocyclic nucleus containing from 5 to 6 atoms in the heterocyclic ring, and at least one carbocyanine dye selected from those represented by the following general formula:

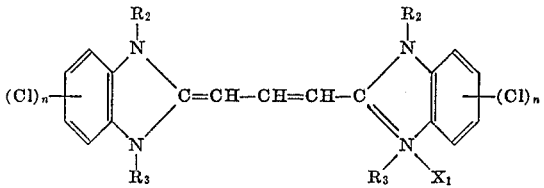

wherein R₂ and R₃ each represents an alkyl group, $n$ represents a positive integer of from 1 to 2, and X₁ represents an acid radical.

2. A photographic silver halide emulsion sensitized with a supersensitizing combination of at least one cyanine dye selected from those represented by the following general formula:

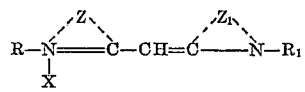

wherein R and R₁ each represents a member selected from the group consisting of an alkyl group, and R and R₁ together represent an alkylene group containing from 2 to 3 carbon atoms, X represents an acid radical, and Z and Z₁ each represents the non-metallic atoms necessary to complete a heterocyclic nucleus containing from 5 to 6 atoms in the heterocyclic ring, and at least one carbocyanine dye selected from those represented by the following general formula:

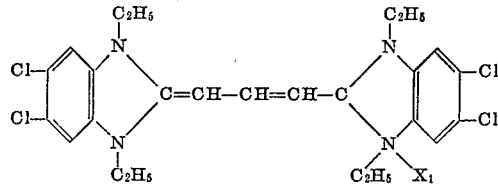

wherein X₁ represents an acid radical.

3. A photographic silver halide emulsion sensitized with a supersensitizing combination of at least one cyanine dye selected from those represented by the following general formula:

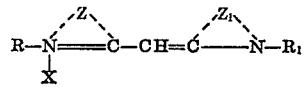

wherein R and R₁ each represents a member selected from the group consisting of an alkyl group, and R and R₁ together represent an alkylene group containing from 2 to 3 carbon atoms, X represents an acid radical, and Z and Z₁ each represents the non-metallic atoms necessary to complete a heterocyclic nucleus containing from 5 to 6 atoms in the heterocyclic ring, and at least one carbocyanine dye selected from those represented by the following general formula:

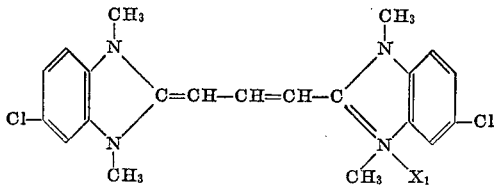

wherein X₁ represents an acid radical.

4. A photographic silver halide emulsion sensitized with a supersensitizing combination of at least one cyanine dye selected from those represented by the following general formula:

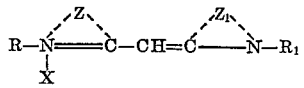

wherein R and R₁ each represents a member selected from the group consisting of an alkyl group, and R and R₁ together represent an alkylene group containing from 2 to 3 carbon atoms, X represents an acid radical, and Z and $Z_1$ each represents the non-metallic atoms necessary to complete a heterocyclic nucleus containing from 5 to 6 atoms in the heterocyclic ring, and at least one carbocyanine dye selected from those represented by the following general formula:

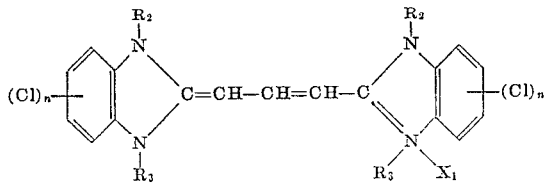

wherein $R_2$ and $R_3$ each represents a member selected from the group consisting of a methyl group and an ethyl group, $n$ represents a positive integer of from 1 to 2, and $X_1$ represents an acid radical.

5. A photographic silver halide emulsion sensitized with a supersensitizing combination of at least one cyanine dye selected from those represented by the following general formula:

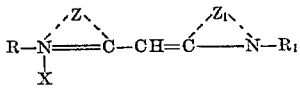

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoaxazole series, and those of the 2-quinoline series, and at least one carbocyanine dye selected from those represented by the following general formula:

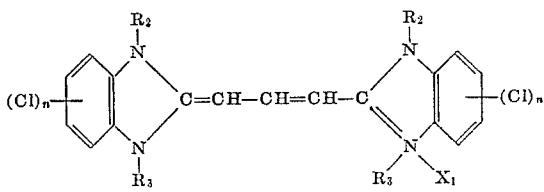

wherein $R_2$ and $R_3$ each represents a member selected from the group consisting of a methyl group and an ethyl group, $n$ represents a positive integer of from 1 to 2, and $X_1$ represents an acid radical.

6. A photographic silver halide emulsion sensitized with a supersensitizing combination of at least one cyanine dye selected from those represented by the following general formula:

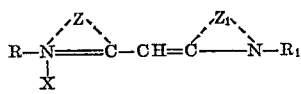

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzooxazole series, and those of the 2-quinoline series, and at least one carbocyanine dye selected from those represented by the following general formula:

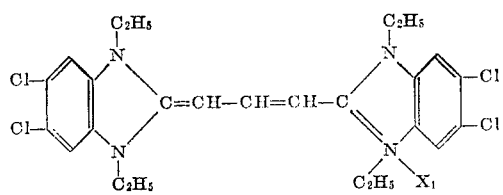

wherein $X_1$ represents an acid radical.

7. A photographic silver halide emulsion sensitized with a supersensitizing combination of at least one cyanine dye selected from those represented by the following general formula:

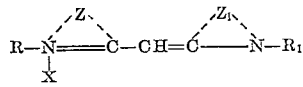

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoxazole series, and those of the 2-quinoline series, and at least one carbocyanine dye selected from those represented by the following general formula:

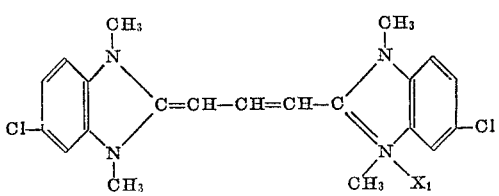

wherein $X_1$ represents an acid radical.

8. A photographic gelatino-silver-halide developing-out emulsion sensitized with a supersensitizing combination of at least one cyanine dye selected from those represented by the following general formula:

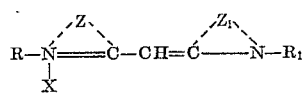

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoxazole series, and those of the 2-quinoline series, and at least one carbocyanine dye selected from those represented by the following general formula:

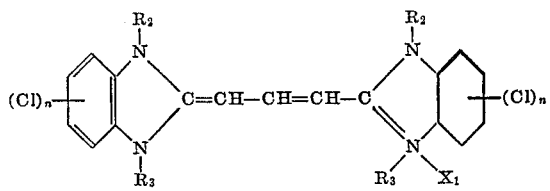

wherein $R_2$ and $R_3$ each represents a member selected from the group consisting of a methyl group and an ethyl group, $n$ represents a positive integer of from 1 to 2, and $X_1$ represents an acid radical.

9. A photographic gelatino-silver-bromiodide developing-out emulsion sensitized with a supersensitizing combination of at least one cyanine dye selected from those represented by the following general formula:

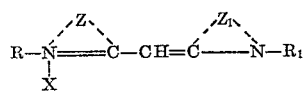

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoselenazole series, those of the naphthoselenazole series, those of the benzoxazole series, and those of the 2-quinoline series, and at least one carbocyanine dye selected from those represented by the following general formula:

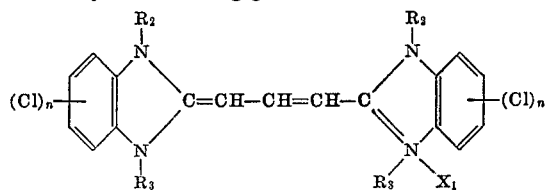

wherein $R_2$ and $R_3$ each represents a member selected from the group consisting of a methyl group and an ethyl group, n represents a positive integer of from 1 to 2, and $X_1$ represents an acid radical.

10. A photographic gelatino-silver-halide developing-out emulsion sensitized with a supersensitizing combination of at least one cyanine dye selected from those represented by the following general formula:

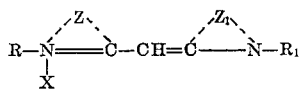

wherein R and $R_1$ each represents an alkyl group of the formula $C_mH_{2m+1}$ wherein $m$ represents a positive integer of from 1 to 2, X represents an acid radical, Z represents the non-metallic atoms necessary to complete a heterocyclic nucleus of the benzothiazole series, and $Z_1$ represents the non-metallic atoms necessary to complete a heterocyclic nucleus of the 2-quinoline series, and at least one carbocyanine dye selected from those represented by the following general formula:

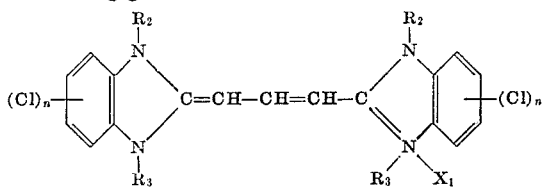

wherein $R_2$ and $R_3$ each represents a member selected from the group consisting of a methyl group and an ethyl group, $X_1$ represents an acid radical, and $n$ represents a positive integer of from 1 to 2.

11. A photographic gelatino-silver-halide developing-out emulsion sensitized with a supersensitizing combination of 1'-ethyl-3-methylthia-2'-cyanine iodide and 5,5',6,6'-tetrachloro-1,1',3,3'-tetraethylbenzimidazolocarbocyanine iodide.

12. A photographic gelatino-silver-halide developing-out emulsion sensitized with a supersensitizing combination of at least one cyanine dye selected from those represented by the following general formula:

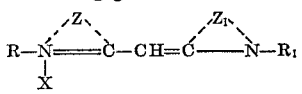

wherein R and $R_1$ each represents an alkyl group of the formula $C_mH_{2m+1}$ wherein $m$ represents a positive integer of from 1 to 2, X represents an acid radical, Z represents the non-metallic atoms necessary to complete a heterocyclic nucleus of the benzoselenazole series, and $Z_1$ represents the non-metallic atoms necessary to complete a heterocyclic nucleus of the 2-quinoline series, and at least one carbocyanine dye selected from those represented by the following general formula:

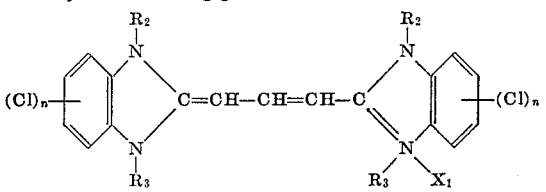

wherein $R_2$ and $R_3$ each represents a member selected from the group consisting of a methyl group and an ethyl group, $X_1$ represents an acid radical, and $n$ represents a positive integer of from 1 to 2.

13. A photographic gelatino-silver-halide developing-out emulsion sensitized with a supersensitizing combination of 1',3-diethylselena-2'-cyanine iodide and 5,5',6,6'-tetrachloro-1,1',3,3'-tetraethylbenzimidazolocarbocyanine iodide.

14. A photographic gelatino-silver-halide developing-out emulsion sensitized with a supersensitizing combination of at least one cyanine dye selected from those represented by the following general formula:

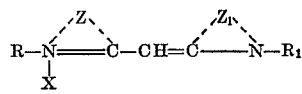

wherein R and $R_1$ each represents an alkyl group of the formula $C_mH_{2m+1}$ wherein $m$ represents a positive integer of from 1 to 2, X represents an acid radical, Z represents the non-metallic atoms necessary to complete a heterocyclic nucleus of the naphthothiazole series, and $Z_1$ represents the non-metallic atoms necessary to complete a heterocyclic nucleus of the 2-quinoline series, and at least one carbocyanine dye selected from those represented by the following general formula:

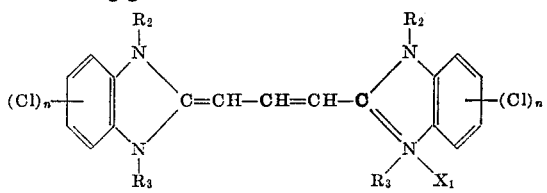

wherein $R_2$ and $R_3$ each represents a member selected from the group consisting of a methyl group and an ethyl group, $X_1$ represents an acid radical, and $n$ represents a positive integer of from 1 to 2.

15. A photographic gelatino-silver-halide developing-out emulsion sensitized with a supersensitizing combination of 1',3-diethyl-6'-methyl-4,5-benzthia-2'-cyanine iodide and 5,5',6,6'-tetrachloro-1,1',3,3'-tetraethylbenzimidazolocarbocyanine iodide.

16. A photographic gelatino-silver-halide developing-out emulsion sensitized with a supersensitizing combination of at least one cyanine dye selected from those represented by the following general formula:

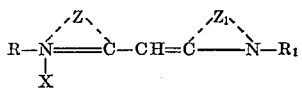

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus of the naphthothiazole series, and at least one carbocyanine dye selected from those represented by the following general formula:

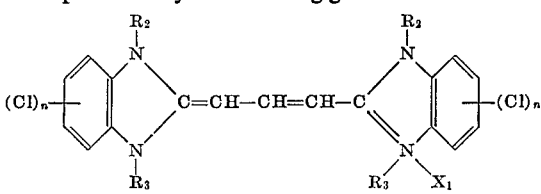

wherein $R_2$ and $R_3$ each represents a member selected from the group consisting of a methyl group and an ethyl group, n represents a positive integer of from 1 to 2, and $X_1$ represents an acid radical.

17. A photographic gelatino-silver-halide developing-out emulsion sensitized with a supersensitizing combination of 3,3'-diethyl-4,5,4',5'-dibenzothiacyanine iodide and 5,5',6,6'-tetrachloro-1,1',3,3'-tetraethylbenzimidazolocarbocyanine iodide.

18. A photographic gelatino-silver-halide developing-out emulsion sensitized with a supersensitizing combination of at least one cyanine dye selected from those represented by the following general formula:

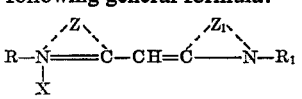

wherein R and $R_1$ each represents an alkyl group of the formula $C_mH_{2m+1}$ wherein $m$ represents a positive integer of from 1 to 2, X represents an acid radical, and Z and $Z_1$ each represents the non-metallic atoms necessary to complete a heterocyclic nucleus of the naphthoselenazole series, and at least one carbocyanine dye selected from those represented by the following general formula:

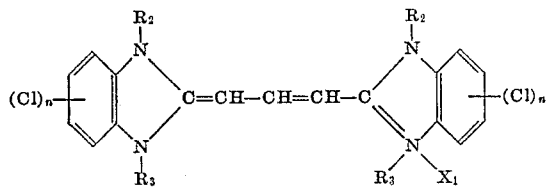

wherein $R_2$ and $R_3$ each represents a member selected from the group consisting of a methyl group and an ethyl group, $n$ represents a positive integer of from 1 to 2, and $X_1$ represents an acid radical.

19. A photographic gelatino-silver-halide developing-out emulsion sensitized with a supersensitizing combination of 3,3'-diethyl-4,5,4',5'-dibenzoselenacyanine iodide and 5,5',6,6'-tetrachloro-1,1',3,3'-tetraethylbenzimidazolocarbocyanine iodide.

No references cited.